United States Patent [19]

Noso et al.

[11] Patent Number: 4,558,459
[45] Date of Patent: Dec. 10, 1985

[54] SPEECH RECOGNITION SYSTEM FOR AN AUTOMOTIVE VEHICLE

[75] Inventors: Kazunori Noso, Yokosuka; Norimasa Kishi, Yokohama; Toru Futami, Yokosuka, all of Japan

[73] Assignee: Nissan Motor Company, Limited, Kanagawa, Japan

[21] Appl. No.: 456,323

[22] Filed: Jan. 6, 1983

[30] Foreign Application Priority Data

May 1, 1982 [JP] Japan ................................. 57-72592

[51] Int. Cl.[4] .............................................. G10L 1/00
[52] U.S. Cl. ........................................ 381/43; 381/57
[58] Field of Search ................................... 381/41–43, 381/46, 47, 57, 110; 364/513, 513.5

[56] References Cited

U.S. PATENT DOCUMENTS 2,657,264 10/1953 Augustadt ............................... 179/1
3,934,084 1/1976 Munson et al. .
4,109,104 8/1978 Toyoshima ...................... 179/1 SD

FOREIGN PATENT DOCUMENTS 2628259 12/1977 Fed. Rep. of Germany .
1603644 11/1981 United Kingdom .

OTHER PUBLICATIONS

Lokerson, "A Unique Real-Time Speech Decoder That Operates from New Perspectives", IEEE *Int'l Conf. on Acoustics*, 1979, pp. 112–115.

*Primary Examiner*—E. S. Matt Kemeny
*Attorney, Agent, or Firm*—Lowe, King, Price & Becker

[57] ABSTRACT

In a speech recognition and control system for an automobile, the microphone preamplifier gain is made inversely proportional to the background sound noise level. Noise level is determined by averaging the microphone output for 100 milliseconds after the recognition switch is closed, before speech.

6 Claims, 11 Drawing Figures

FIG.4

SPEECH RECOGNITION SYSTEM FOR AN AUTOMOTIVE VEHICLE

BACKGROUND OF THE INVENTION

1. Field of the Invention

The present invention relates generally to a speech recognition system for an automotive vehicle, and more particularly to a speech recognition system by which driver's spoken instructions can be reliably recognized even as noise fluctuates intensely within the passenger compartment.

2. Description of the Prior Art

There is a well-known speech recognizer which can activate various actuators in response to human spoken instructions. When this speech recognizer is mounted on a vehicle, the headlight, for instance, can be turned on or off in response to spoken instructions such as "Headlight on" or "Headlight off". Such a speech recognizer usually can recognize various spoken instructions in order to control various actuators; however, there are some problems involved in applying this system to an automotive vehicle.

Usually, the speech recognizer is used in a relatively quiet environment; however, the speech recognition system for an automotive vehicle is usually used within a relatively noisy passenger compartment and additionally the noise fluctuates intensely therewithin, in particular, when the vehicle windows are kept opened and when the vehicle is running on a noise city street. Therefore, one of the major problems is how to cope with erroneous spoken phrase recognitions caused by fluctuating noise within the passenger compartment.

In order to distinguish a spoken instruction from noise, conventionally there is provided a voice detector in the speech recognizer, by which the start and the end of a spoken instruction are determined by detecting whether the magnitude of a spoken instruction signal exceeds a predetermined reference threshold voltage level for a predetermined period of time or whether the magnitude of the spoken instruction signal drops below the predetermined reference threshold voltage level for another predetermined period of time, respectively.

By the way, a person or driver has a tendency to speak quickly and loudy when the background noise level is relatively high but slowly and in a whisper when the background noise level is relatively low. Therefore, it is necessary to provide a wide dynamic range for the speech recognizer. Here, the dynamic range means the ratio of the loudest to the weakest sound intensity which can be detected by the system.

In the prior-art speech recognizer, however, since analog-digital converters are usually incorporated within the speech recognizer, it is very difficult to provide a sufficiently wide dynamic range which can cover a wide sound intensity from a loud voice to a low voice.

In order to overcome the above-mentioned problems, there has been proposed a method of incorporating a gain controller at the input stage of the speech recognizer. In this case, the gain of the recognizer is adjusted inversely proportional to the sound intensity inputted thereto, so that the sound levels of spoken instructions can automatically be adjusted within a narrower range.

In such a prior-art speech recognizer as described above, however, in the case where a spoken instruction is uttered toward the microphone immediately after a loud noise such as horn sound has been produced, since the gain of the gain controller has already been adjusted to a lower level, there exists a problem in that it is impossible to reliably detect the start of a spoken instruction.

A more detailed description of a typical prior-art speech recognizer will be made with reference to the attached drawings in conjunction with the present invention under DETAILED DESCRIPTION OF THE PREFERRED EMBODIMENTS.

SUMMARY OF THE INVENTION

With these problems in mind therefore, it is the primary object of the present invention to provide a speech recognition system for an automotive vehicle which can reliably detect the start and end of a spoken instruction even if noise level is high and fluctuates intensely within the passenger compartment of an automotive vehicle, that is, which can reliably prevent erroneous recognition of spoken instructions due to noise within the passenger compartment.

To achieve the above-mentioned object, in the speech recognition system for an automotive vehicle according to the present invention, the gain at which the spoken instruction signal including noise transduced via a microphone is amplified is adjustably fixed to an appropriate level determined according to the background noise level smoothed or averaged after the recognition switch has been closed but before a spoken instruction is uttered toward the microphone, in such a way that the gain is inversely proportional to the background noise level.

The system according to the present invention comprises a level detector for detecting background noise level, a sample holding circuit for holding the signal from the level detector for a predetermined time period in response to a recognition switch signal, and a gain controller for controlling the gain of the system in inverse proportion to the held background noise level, in addition to a conventional speech recognizer.

Further, it is of course possible to incorporate the above-mentioned essential elements or sections within a microcomputer together with those of a speech recognizer and to implement the same or similar functions in accordance with appropriate software stored in a memory unit provided therein.

BRIEF DESCRIPTION OF THE DRAWINGS

The features and advantages of the speech recognition system for an automotive vehicle according to the present invention will be more clearly appreciated from the following description taken in conjunction with the accompanying drawings in which like reference numerals designate corresponding elements or sections throughout the drawings and in which.

DETAILED DESCRIPTION OF THE PREFERRED EMBODIMENTS

To facilitate understanding of the present invention, a brief reference will be made to the principle or operation of a typical prior-art speech recognizer, with reference to FIG. 1.

Figure 1:
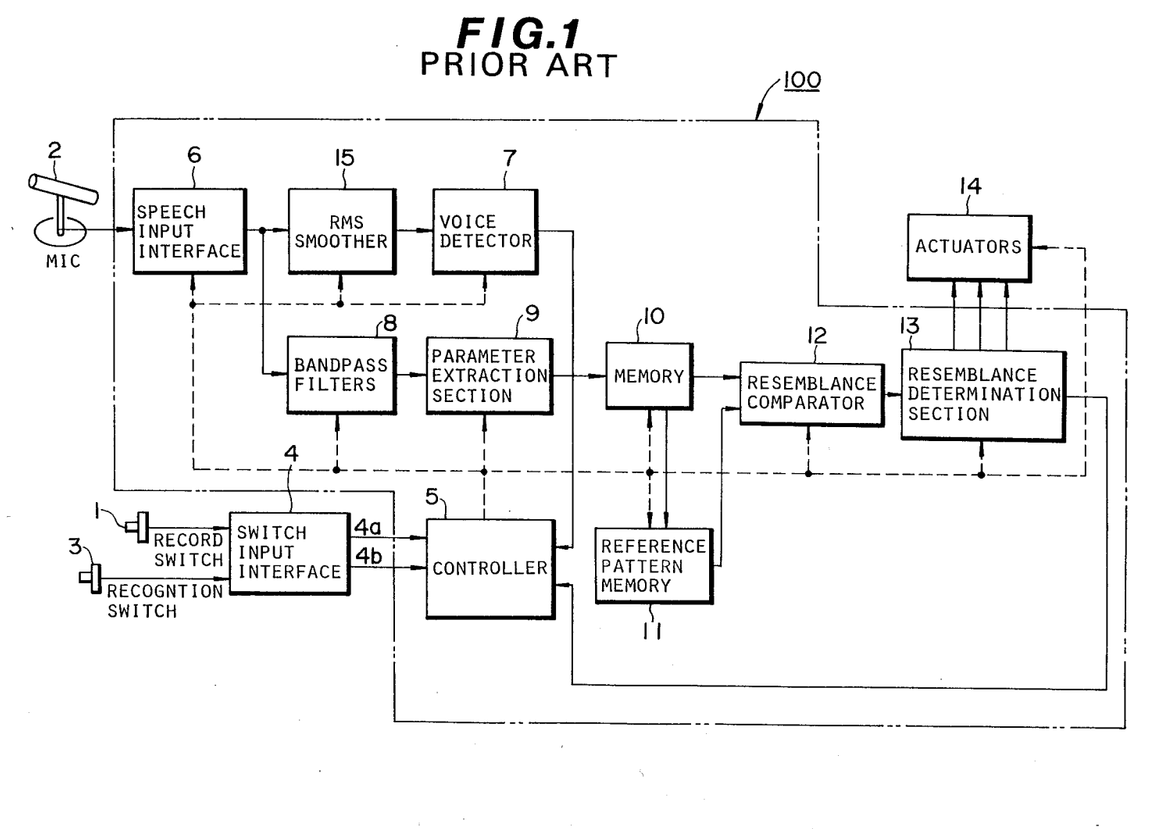
FIG. 1 is a schematic block diagram of a typical prior-art speech recognizer for assistance in explaining the operations thereof.

FIG. 1 shows a schematic block diagram of a typical speech recognizer 100. To use the speech recognizer, the user must first record a plurality of predetermined spoken instructions. Specifically, in this spoken instruction recording mode (reference mode), the user first depresses a record switch 1 disposed near the user. When the record switch 1 is depressed, a switch input interface 4 detects the depression of the record switch 2 and outputs a signal to a controller 5 via a wire 4a. In response to this signal, the controller 5 outputs a recording mode command signal to other sections in order to preset the entire speech recognizer to the recording mode. In the spoken instruction recording mode, when the user says a phrase to be used as a spoken instruction, such as "open doors", near a microphone 2, the spoken phrase is transduced into a corresponding electric signal through the microphone 2, amplified through a speech input interface 6 consisting mainly of a spectrum-normalizing amplifier, smoothed through a root-mean-square (RMS) smoother 15 including a rectifier and a smoother, and finally inputted to a voice detector 7.

The spectrum-normalizing amplifier amplifies the input at different gain levels at different frequencies, so as to adjust the naturally frequency-dependent power spectrum of human speech to a more nearly flat power spectrum. This voice detector 7 detects whether or not the magnitude of the spoken phrase signal exceeds a predetermined level for a predetermined period of time (150 to 250 ms) in order to recognize the start of the spoken phrase input signal and whether or not the magnitude of the signal drops below a predetermined level for a predetermined period of time (about 300 ms) in order to recognize the end of the signal. Upon detection of the start of the signal, this voice detector 7 outputs another recording mode command signal to the controller 5. In response to this command signal, the controller 5 activates a group of bandpass filters 8, so that the spoken phrase signal from the microphone 2 is divided into a number of predetermined frequency bands. Given to a parameter extraction section 9, the frequency-divided spoken phrase signals are squared or rectified therein in order to derive the voice power spectrum across the frequency bands and then converted into corresponding digital time-series matrix-phonetic pattern data (explained later). These data are then stored in a memory unit 10. In this case, however, since the speech recognizer is set to the spoken instruction recording mode by the depression of the record switch 1, the time-series matrix-phonetic pattern data are transferred to a reference pattern memory unit 11 and stored therein as reference data for use in recognizing the speech instructions.

After having recorded the reference spoken instructions, the user can input speech instructions, such as "open doors", to the speech recognizer through the microphone 2 while depressing a recognition switch 3.

When this recognition switch 3 is depressed, the switch input interface 4 detects the depression of the recognition switch 3 and outputs a signal to the controller 5 via a wire 4b. In response to this signal, the controller 5 outputs a recognition mode command signal to other sections in order to preset the entire speech recognizer to the recognition mode. In this spoken phrase recognition mode, when the user says an instruction phrase similar to the one recorded previously near the microphone 2 and when the voice detector 7 outputs a signal, the spoken instruction is transduced into a corresponding electric signal through the microphone 2, amplified through the speech input interface 6, filtered and divided into voice power spectra across the frequency bands through the band pass filters 8, squared or rectified and further converted into corresponding digital time-series matrix phonetic pattern data through the parameter extraction section 9, and then stored in the memory unit 10, in the same manner as in the recording mode.

Next, the time-series matrix-phonetic pattern data stored in the memory unit 10 in the recognition mode are sequentially compared with the time-series matrix-phonetic pattern data stored in the reference pattern memory unit 11 in the recording mode by a resemblance comparator 12. The resemblance comparator 12 calculates the level of correlation of the inputted speech instruction to the reference speech instruction after time normalization and level normalization to compensate for variable speaking rate (because the same person might speak quickly and loudly at one time but slowly and in a whisper at some other time). The correlation factor is usually obtained by calculating the Tchebycheff distance (explained later) between recognition-mode time-series matrix-phonetic pattern data and recording-mode time-series matrix-phonetic pattern data. The correlation factor calculated by the resemblance comparator 12 is next given to a resemblance determination section 13 to determine whether or not the calculated values lie within a predetermined range, that is, to evaluate their cross-correlation. If within the range, a command signal, indicating that a recognition-mode spoken instruction having adequate resemblance to one of the recorded instruction phrases, is outputted to one of actuators 14 in order to open the vehicle doors, for instance. The abovementioned operations are all executed in accordance with command signals outputted from the controller 5.

Description has been made hereinabove of the case where the speech recognizer 100 comprises various discrete elements or sections; however, it is of course possible to embody the speech recognizer 100 with a microcomputer including a central processing unit, a read-only memory, a random-access memory, a clock oscillator, etc. In this case, the voice detector 7, the parameter extraction section 9, the memory 10, the reference pattern memory 11, the resemblance comparator 12 and the resemblance determination section 13 can all be incorporated within the microcomputer, executing the same or similar processes, calculations and/or operations as explained hereinabove.

The digital time-series matrix-phonetic pattern data and the Tchebycheff distance are defined as follows:

In the case where the number of the bandpass filters is four and the number of time-series increments for each is 32, the digital recording-mode time series matrix-phonetic pattern data can be expressed as $$F(A) = f(i,j) = \begin{vmatrix} f(1,1), f(1,2), f(1,3) \ldots, f(1,32) \\ f(2,1), f(2,2), f(2,3) \ldots, f(2,32) \\ f(3,1), f(3,2), f(3,3) \ldots, f(3,32) \\ f(4,1), f(4,2), f(4,3) \ldots, f(4,32) \end{vmatrix}$$

where A designates a first recording-mode speech instruction (reference) (e.g. OPEN DOORS), i denotes the filter index, and j denotes time-series increment index.

If a first recognition-mode speech instruction (e.g. OPEN DOORS) is denoted by the character "B", the Tchebycheff distance can be obtained from the following expression:

$$l = |F(A) - F(B)| = \sum_{i=1}^{4} \sum_{j=1}^{32} |f_A(i,j) - f_B(i,j)|$$

Figure 2:
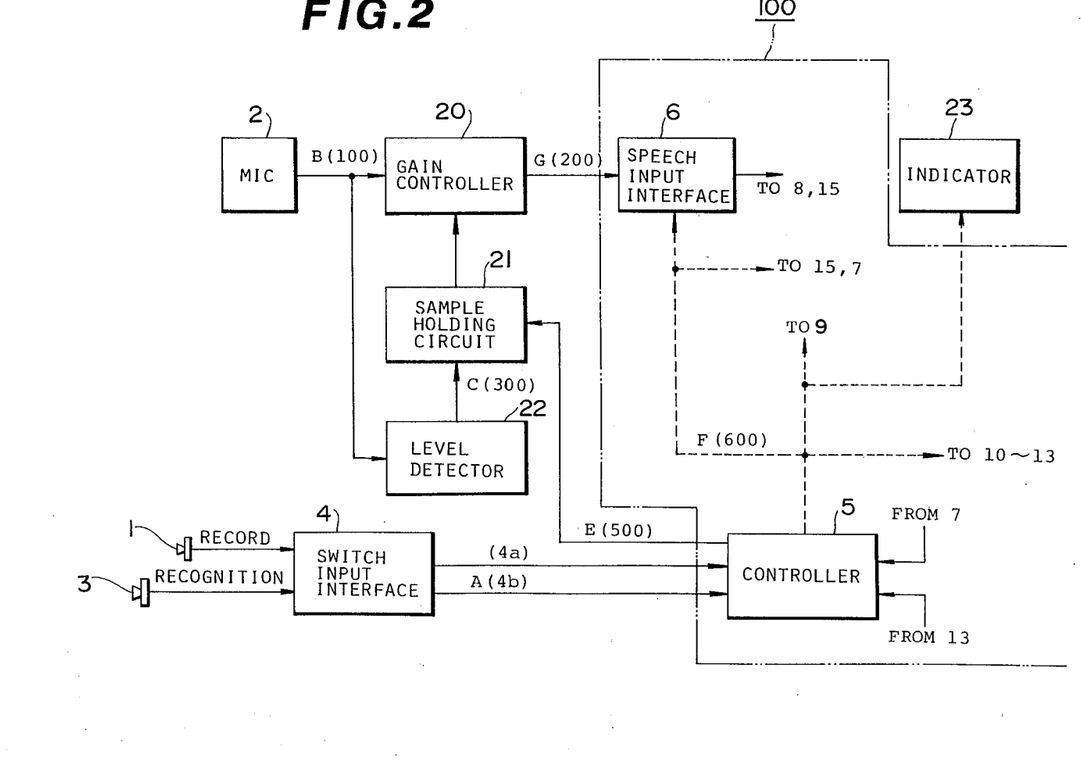
FIG. 2 is a schematic block diagram of an essential portion of a first embodiment of the speech recognition system for an automotive vehicle according to the present invention.

In view of the above description, reference is now made to a first embodiment of the speech recognition system according to the present invention with reference to FIG. 2, in which only the essential portions of the invention are shown by various discrete elements or sections.

In FIG. 2, the reference numeral 1 is a record switch; the reference numeral 2 is a microphone; the reference numeral 3 denotes a recognition switch; the reference numeral 4 denotes a switch input interface, the functions of which have already been explained hereinabove. Further, the reference numeral 6 denotes a speech input interface; the reference numeral 5 denotes a controller, which are both incorporated within the speech recognizer 100.

The reference numeral 22 denotes a level detector for smoothing or averaging the background noise transduced through the microphone 2, which is usually made up of a rectifier and a smoother and outputs an averaged background noise level signal (300) therefrom. The reference numeral 21 denotes a sample holding circuit which can be turned on or off in response to a first command signal (500) outputted from the controller 5. When turned off in response to a L-voltage level signal of a first command signal from the controller 5, the sample holding circuit 21 passes the averaged background noise level signal (300) as it is; on the other hand, when turned on in response to a H-voltage level signal of the first command signal from the controller 5, the circuit 21 holds the output signal at an averaged background noise level obtained when the H-voltage level signal is inputted thereto, thereafter outputting the held constant level signal therefrom.

The reference numeral 20 denotes a gain controller which can amplify the spoken instruction signal (100) including background noise transduced through the microphone 2 on the basis of the gain inversely proportional to the signal inputted thereto from the sample holding circuit 21. In more detail, the gain controller 20 amplifies the spoken instruction signal at a higher gain when the signal from the sample holding circuit 21 is low, but at a lower gain when the signal is high. Therefore, if the driver utters a spoken instruction loudly when the background noise level is high, the spoken instruction signal is amplified at a lower gain; on the other hand, if the driver utters a spoken instruction in a whisper when the background noise level is low, the spoken instruction is amplified at a higher gain, thus the spoken instruction being amplified into almost the same level in both the cases.

Further, in this embodiment, the controller 5 is so designed as to output a L-voltage level command signal (500) for a predetermined time period $T_0$ (e.g. about 0.2 sec) to the sample holding circuit 21, when the recognition switch 3 is depressed, for directly passing the averaged background noise level signal (300) from the level detector 22 to the gain controller 20.

Furthermore, when the signal (500) applied from the controller 5 to the sample holding circuit 21 changes from a L-voltage level to H-voltage level, the controller 5 outputs another second command signal (600) to various sections or elements in the system 100 in order to set them to the recognition mode.

Further, in FIG. 2, the reference numeral 23 denotes an indicator such as a buzzer or a light for informing the driver that the recognition system is now ready for recognition of a spoken instruction. In response to this indication, therefore, the driver must utter a spoken instruction toward the microphone.

Now, the operation of the essential portion of the first embodiment according to the present invention will be described hereinbelow with reference to FIGS. 2 and 3(A) to 3(G).

Figure 3A:
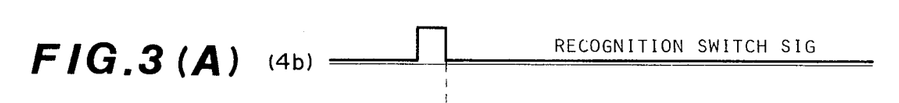
FIG. 3(A) is a graphical representation of the waveforms of a recognition switch signal (4b) as measured at point A in FIG. 2.
Figure 3B:
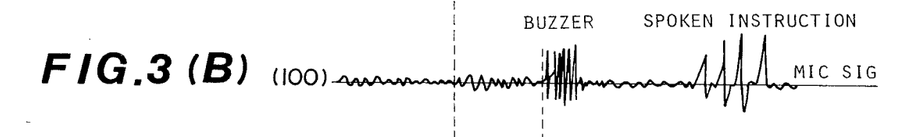
FIG. 3(B) is a graphical representation of the waveforms of the spoken instruction signal (100) including noise transduced through a microphone as measured at point B in FIG. 2.
Figure 3C:
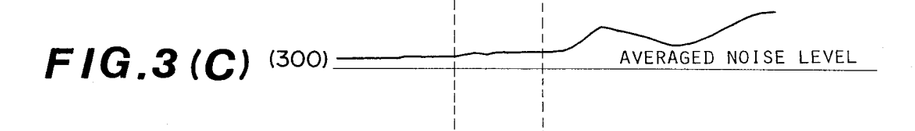
FIG. 3(C) is a graphical representation of the waveform of the output signal (300) from a level detector as measured at point C in FIG. 2.
Figures 3D, 3E:
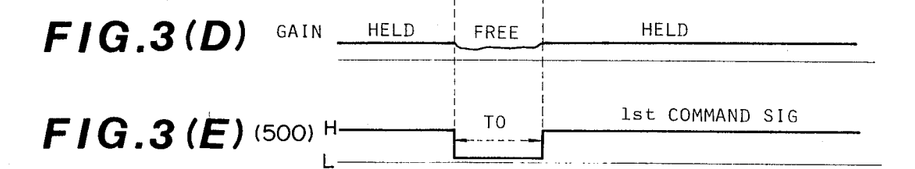
FIG. 3(D) is a graphical representation of the gain of a gain controller according to the present invention.
FIG. 3(E) is a graphical representation of the waveform of a first command signal (500) from a controller as measured at point E in FIG. 2.

Prior to the depression of the recognition switch 3, the sample holding circuit 21 is held at a predetermined constant level as shown in FIG. 3(E) in response to a H-voltage level signal (500) from the controller 5 as shown in FIG. 3(E).

When the recognition switch 3 is depressed and next released, in response to the trailing edge of the recognition signal (4b) as shown in FIG. 3(A), the controller 5 outputs a L-voltage level signal (500) as shown in FIG. 3(E) to the sample holding circuit 21 for a predetermined time period $T_0$, so that the holding condition of the holding circuit 21 is released and the holding circuit 21 becomes free. Since the background noise signal transduced through the microphone 2 is being averaged by the level detector 22 and applied to the sample holding circuit 21 during this time period $T_0$, the averaged background noise level signal (300) as shown in FIG. 3(C) is directly applied to the gain controller 20. As a result, the gain of the gain controller 20 is variable during this time period $T_0$ in inverse proportion to the averaged noise level signal (300) from the level detector 22, as depicted in FIG. 3(D). Further, in this case, it is necessary to determine this time period $T_0$ so that the noise level signal (300) from the level detector 22 can be sufficiently steady within this time period $T_0$. In the case of an automotive vehicle, approximately 50 ms or more is necessary.

The time period $T_0$ after the recognition switch 3 has been depressed, since the controller 5 outputs again a H-voltage level signal (500) as shown in FIG. 3(E) to the sample holding circuit 21, in response to this H-level signal, the sample holding circuit 21 holds the background noise signal (300) outputted from the level detector 22.

Figure 3F:
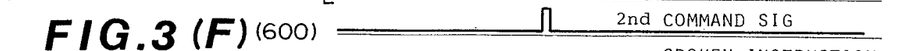
FIG. 3(F) is a graphical representation of the waveform of a second command signal (600) outputted from the controller as measured at point F in FIG. 2.
Figure 3G:
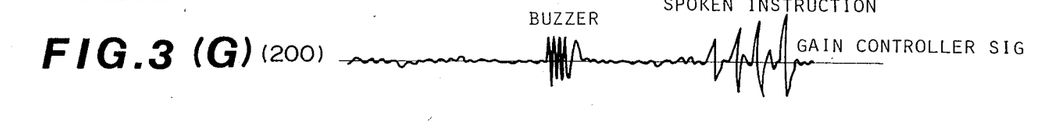
FIG. 3(G) is a graphical representation of the waveform of the spoken instruction signal (200) including noise outputted from a gain controller as measured at point G in FIG. 2.

As a result, the gain of the gain controller 20 is kept at a constant level as depicted in FIG. 3(D). Simultaneously, since the controller 5 outputs a spoken instruction start command signal (600) as shown in FIG. 3(F) to the various sections including the indicator 23 within the speech recognizer 100, the recognition system is set to recognition mode and the indicator 23, for instance, such as a buzzer is actuated.

When the driver utters a spoken instruction toward the microphone 2 immediately after the buzzer stops ringing, since the gain of the gain controller 20 has already been fixed or held at a constant level before a spoken instruction is inputted to the system, it is possible to amplify a spoken instruction on a constant gain reliably, that is, to detect the start and end of a spoken instruction reliably. In more concrete, even when an instantaneous loud noise such as horn sound is produced immediately before a spoken instruction is uttered, the system can amplify a spoken instruction on an appropriate gain without influence of unexpected, instantaneous loud noise.

Figure 4:
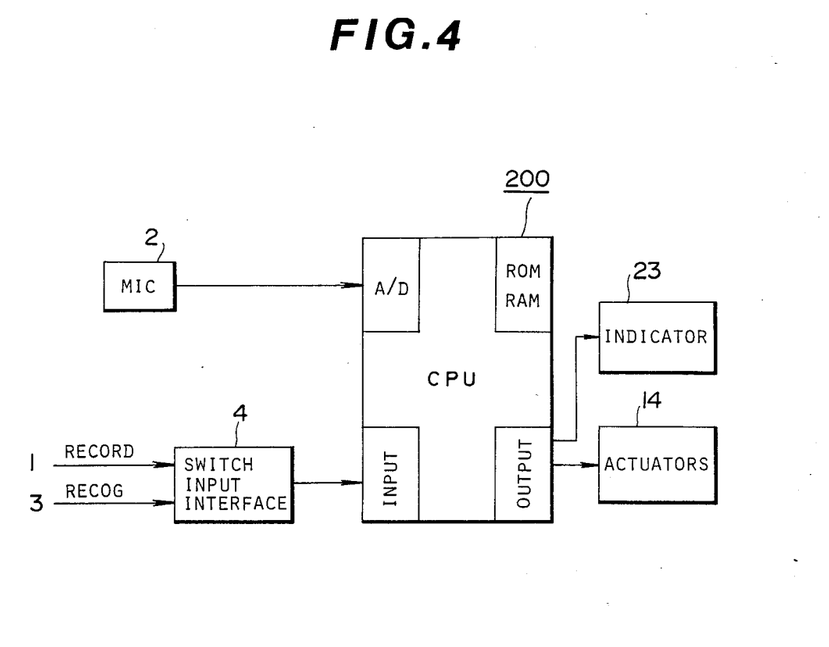
FIG. 4 is a schematic block diagram of a second embodiment of the speech recognition system for an automotive vehicle according to the present invention.

FIG. 4 shows a second embodiment of the speech recognition system according to the present invention. In this embodiment, the gain controller 20, the sample holding circuit 21 and the level detector 22 described in the first embodiment and shown in FIG. 2 are all incorporated within a microcomputer 200 provided with an analog-to-digital converter, a central processing unit, a read-only memory, a random-access memory, and input/output interfaces, etc. That is to say, some of the functions of the present invention are implemented via arithmetic operations executed in accordance with appropriate software, in place of hardware.

Further, in this embodiment, various elements or sections such as the speech input interface 6, the RMS smoother 15, the voice detector 7, the bandpass filters 8, the parameter extraction section 9, the memory 10, the reference pattern memory 11, the resemblance comparator 12, the resemblance determination section 13, the controller 5, etc. are all incorporated within the microcomputer 200 which performs the same functions as those of the abovementioned discrete elements or sections in accordance with appropriate program stored therein.

In response to a speech recognition switch signal, the microcomputer 200 can detect the start of a spoken instruction reliably in the same way as described already with reference to FIGS. 2 and 3.

Figure 5:
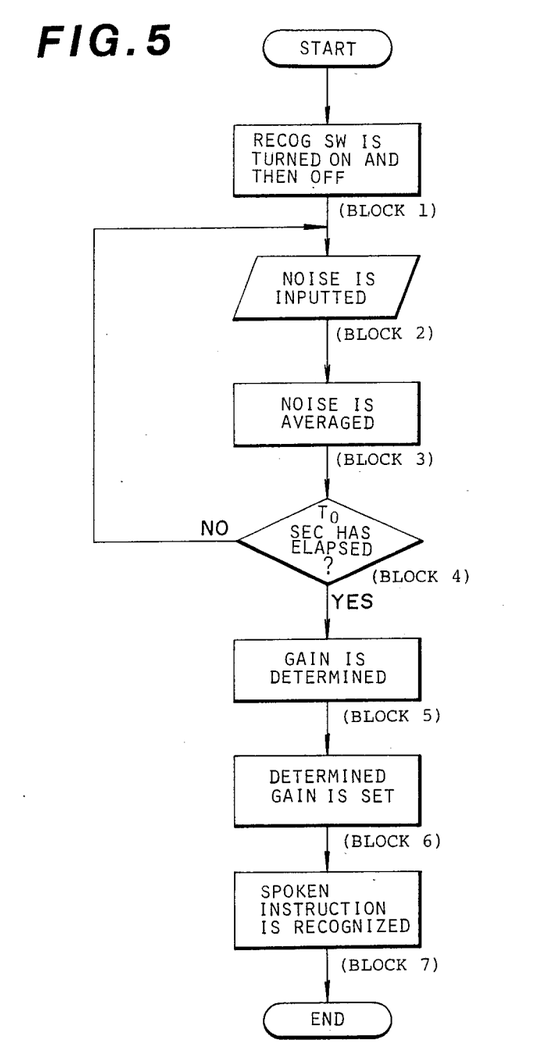
FIG. 5 is a flowchart showing the method of adjustably switching the gain of the system in according with a program stored in a microcomputer shown in FIG. 4.

FIG. 5 is a flowchart showing the steps of adjusting the gain of the system in accordance with a program stored in the microcomputer shown in FIG. 4.

When the driver first depresses the recognition switch 3 and releases it, a recognition switch signal (4b) is outputted to the controller 5 (in block 1). In response to the trailing edge of this signal (4b), the controller 5 outputs a first command signal to begin inputting background noise signal transduced through the microphone (in block 2) and averages the inputted background noise signal to obtain the averaged noise level (in block 3). Simultaneously, in response to the trailing edge of the signal (4b), program control starts counting time and determines whether or not a predetermined time period $T_0$ has elapsed (in block 4). If not yet elapsed, control continues inputting the background noise for updating the current background noise level; however, if elapsed, a gain is determined on the basis of the averaged background noise level obtained just when the time period $T_0$ has elapsed (in block 5). In accordance with the determined noise level, the gain of the speech input interface 6 is switched or set in the system (in block 6). In this case, the determined gain is inversely proportional to the averaged background noise level obtained when the predetermined time period $T_0$ has elapsed. Thereafter, the controller 5 outputs a recognition mode command signal to the entire system, so that the system is ready for recognizing a spoken instruction inputted through the microphone (in block 7).

In the flowchart, although the step of actuating the buzzer 23 is not shown, since the predetermined time period $T_0$ is as short as, for instance, about 50 milliseconds or more, even if the buzzer 23 is eliminated, there may be no problem providing that the driver utters a spoken instruction after he has released the recognition switch.

Furthermore, in the case where the system is configured by discrete elements, since the level detector 22 is usually made up of one or more capacitors, there inevitably exists a time lag. However, in the case where the system is configured by a microcomputer, since the function of the level detector 22 (smoothing function) can readily be implemented by appropriate software on the basis of calculations without any significant time lag, it is possible improve the response speed to the fluctuating background noise level.

As described above, in the speech recognition system according to the present invention, since the gain of the amplifier for amplifying a spoken instruction signal including noise transduced through the microphone is adjustably fixed at an appropriate level determined according to the smoothed background noise level obtained after the recognition switch has been depressed but before a spoken instruction is inputted to the system, in such a way that the gain is inversely proportional to the background noise level, even if background noise level fluctuates intensely just before a spoken instruction is inputted to the microphone, it is possible to reliably detect a spoken instruction at an appropriately-adjusted gain.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A speech recognition system for an automotive vehicle which can activate an actuator in response to a spoken instruction inputted through a microphone which comprises:
   (a) a recognition switch for outputting a recognition switch signal when closed;
   (b) a controller for outputting a first command signal in response to the recognition switch signal and a second command signal a predetermined time period after the first command signal has been outputted therefrom;
   (c) means for controlling the gain at which a spoken instruction signal transduced through the microphone is amplified, said gain controlling means detecting the background noise signal transduced through the microphone in response to the first command signal from said controller, averaging the detected background noise signal, and adjustably fixing the gain at an appropriate level on the basis of the averaged background noise level obtained when the second command signal is outputted from said controller thereto, in such a way that the gain is inversely proportional to the averaged background noise level; and (c) a speech recognizer for amplifying a spoken instruction signal inputted through the microphone after said controller outputs the second command signal to said gain controlling means on the basis of the gain adjustably fixed by said gain controlling means and for activating the actuator when the spoken instruction signal amplified on the gain adjustably fixed by said gain controlling means is determined to be resemble to that previously recorded in the system.

2. A speech recognition system for an automotive vehicle as set forth in claim 1, wherein said means for controlling the gain for amplifying a spoken instruction signal transduced through the microphone comprises:

(a) a level detector connected to the microphone for detecting and averaging the background noise transduced through the microphone and outputting an averaged noise level signal;

(b) a sample holding circuit connected to said level detector and said controller for passing the averaged noise level signal from said level detector in response to the first command signal from said controller and holding and outputting the averaged noise level signal from said level detector in response to the second command signal from said controller; and (c) a gain controller connected to the microphone, said sample holding circuit and said speech recognizer for amplifying the spoken instruction signal outputted from the microphone at the gain determined on the basis of the averaged background noise level signal obtained when the second command signal is outputted from said controller to said sample holding circuit, in such a way that the gain is inversely proportional to the averaged background noise level.

3. A speech recognition system for an automotive vehicle which can activate an actuator in response to a spoken instruction inputted through a microphone which comprises:

(a) a recognition switch for outputting a recognition switch signal when closed; and (b) a microcomputer connected to said recognition switch for detecting the background noise level outputted from the microphone in response to the recognition switch signal, averaging the detected background noise level, determining whether or not a predetermined time period has elapsed, if elapsed adjusting the gain, at which the spoken instruction outputted from the microphone is amplified, to an appropriate level on the basis of the averaged background noise level obtained when the predetermined time period has elapsed in such a way that the determined gain is inversely proportional to the detected background noise level, amplifying the spoken instruction inputted through the microphone after said recognition switch has been released, and activating the actuator when the spoken instruction signal amplified on the adjusted gain is determined to be resemble to that previously recorded in the system.

4. A speech recognition system for an automotive vehicle as set forth in either claim 1 or 3, wherein the predetermined time period between the first and second command signals is approximately from 50 to 200 milliseconds.

5. A speech recognition system for an automotive vehicle as set forth in either claim 1 or 3, which further comprises an indicator for indicating that the gain, at which the spoken instruction signal outputted from the microphone is amplified, is fixed at an appropriate level on the basis of the averaged background noise level obtained after said recognition switch has been released.

6. A method of amplifying the spoken instruction signal including noise outputted from a microphone in a speech recognition system, which comprises the following steps of:

(a) detecting that a recognition switch is turned on and then off;

(b) inputting background noise signal through the microphone in response to the detected recognition switch signal;

(c) averaging the inputted background noise signal;

(d) determining whether or not a predetermined time period has elapsed;

(e) if not elapsed, continuing inputting background noise signal and averaging the inputted background noise signal;

(f) if elapsed, determining the gain at which the spoken instruction signal is amplified at an appropriate level on the basis of the averaged background noise level obtained when the predetermined time period has elapsed in such a way that the gain is inversely proportional to the averaged background noise level;

(g) setting the determined gain in the system; and (h) amplifying the spoken instruction inputted through the microphone at the set gain, in order to reliably recognize the spoken instruction signal including noise.

* * * * *